United States Patent

[11] 3,596,860

| [72] | Inventor | George MacKay<br>Corner Yacht Street & Gerald Avenue,<br>Clontarf Brisbane, Queensland, Australia |
|---|---|---|
| [21] | Appl. No. | 836,878 |
| [22] | Filed | June 26, 1969 |
| [45] | Patented | Aug. 3, 1971 |
| [32] | Priority | June 27, 1968 |
| [33] | | Australia |
| [31] | | 39858/68 |

[54] BRACKET FOR MOUNTING A FLUSH-TYPE ELECTRICAL PLATE
2 Claims, 3 Drawing Figs.

[52] U.S. Cl. .................................................... 248/216,
220/3.9, 248/300
[51] Int. Cl. .................................................... H02g 3/08

[50] Field of Search .......................................... 248/216,
300, 342, 343, 27; 220/3.2, 3.9

[56] References Cited
UNITED STATES PATENTS
| 2,252,953 | 8/1941 | Walters ..................... | 220/3.9 |
| 3,345,029 | 10/1967 | Palmer ..................... | 248/216 X |

*Primary Examiner*—Roy D. Frazier
*Assistant Examiner*—J. Franklin Foss
*Attorney*—Holman & Stern

ABSTRACT: A bracket for a flush-type electrical plate has extensions in which nails are held firmly but movably for driving into a wall stud. The nails are preferably held outside the periphery of the front mounting plate for easy accessibility.

PATENTED AUG 3 1971  3,596,860

Inventor
GEORGE REAY MACKAY
By Holman, Glascock,
Downing & Seebold
Attorneys

BRACKET FOR MOUNTING A FLUSH-TYPE ELECTRICAL PLATE

BACKGROUND OF THE INVENTION

This Invention relates to a bracket for mounting a flush-type electrical plate, such as a switchplate or switch-outlet plate, in the wall of a building.

These brackets have normally consisted of sheet metal bent in L-shape, with one arm of the L being provided with holes by which it may be secured to a wooden wall stud by clouts and the front arm extending inside and adjacent the wall sheeting and having an aperture (usually rectangular) to accommodate the electrical plate.

These L-shaped brackets have various disadvantages.

The securing clouts are behind the front arm, thereby making access difficult to hammer them home, particularly owing to their short length and the necessity to hold them manually to start them into the wood.

The grip of the clouts in the wood is often inadequate and the mounting of the bracket not firm.

When two plates are to be mounted directly opposite each other, one on each side of a wall, the bracket flanges lying on the stud may abut and, (if the stud is slightly undersize) the brackets may project slightly, to bulge or even crack the wall sheeting.

SUMMARY OF THE INVENTION

One object of the present invention is to provide a bracket secured to a stud by full-length nails situated to be fully accessible to hammering and in which the front-to-back dimension of the bracket may be made quite small. The nail may pass through a comparatively long support, on the bracket to give firmer attachment.

Another object is to arrange that the nails are held ready for driving by attachment to the bracket and therefore do not need hand-holding to start them into the wood.

The invention comprises a bracket for attaching a flush-type electrical plate to a wall stud of a building, including;

a front plate apertured to accommodate said electrical plate and having one edge adapted to lie adjacent said stud;

a pair of extensions projecting one from each of the edges of said front plate flanking said one edge, each said extension extending rearwardly out of the plane of said front plate; and nail gripping means on each extension to hold a nail firmly, the nail being movable longitudinally through said means for driving into said stud when the bracket is in position for attachment.

The nail is preferably held parallel to the front plate but rearwards of and outside its perimeter.

The nail holding extension may consist of an extension of a sheet-metal front plate bent rearwards and rolled over to form a nail-holding tube.

In order that the invention may be better understood, exemplary embodiments will now be described with reference to the drawings in which:

DETAILED DESCRIPTION OF THE INVENTION

Each bracket of the embodiments shown is formed from sheet metal, and is cut and pressed from a single piece.

Figure 1:
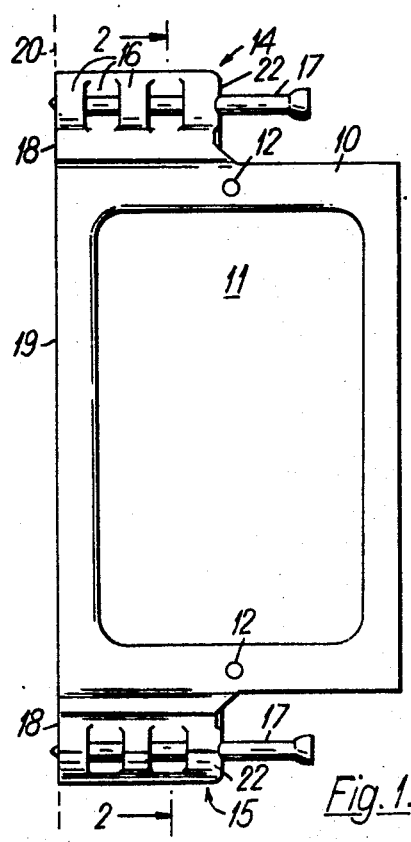
FIGS. 1 and 2 show front elevation and sectional views of a mounting bracket, respectively.
Figure 2:
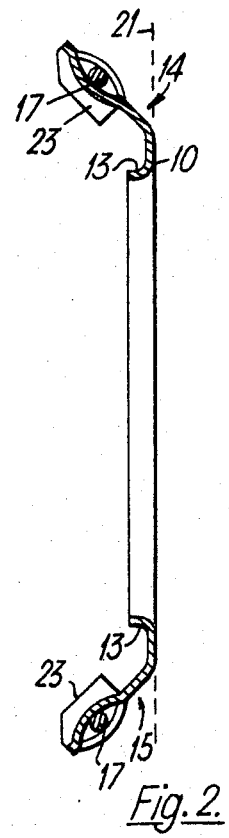

In FIGS. 1 and 2, it will be seen that a rectangular front plate 10 has an aperture 11 therein to accommodate the electrical wallplate, which may be a switchplate, an outlet plate, a switch-and-outlet-plate or any other flush-type electrical plate to be wall-mounted.

This plate is attached to front plate 11 by screws engaged in appropriate holes 12. The plate 11 is stiffened by a surround 13 pressed in from the periphery of aperture 11.

Plate 10 has top and bottom extensions 14, 15 each inclining rearwards from the plane of plate 10. Each extension is slit at intervals and the slit portions 16 bent alternately in and out to provide gripping means for a nail 17, firmly held therein. An edge 18 of each extension is flush with edge 19 of plate 10.

It will be seen that nails 17 are held outside the perimeter of plate 10 as viewed in FIG. 1, and that they are behind plate 10 (FIG. 2) in position to be driven into a stud well behind its front edge. The side edge of the stud is indicated at 20 in FIG. 1 and its front edge at 21 in FIG. 2.

In use, then, the edges 19, 18 of the plate 10 and extensions 14, 15 respectively, are placed against the side of a stud and nails 17 driven into the stud, passing through the staggered slit gripping means 16 until the nail head encounters edge 22 of the extension, which is flanged rearwards at 23 (FIG. 2).

Both nails are in a position for easy access for hammering and do not need to be held by hand to start them into the wood.

The nails are furthermore engaged in the gripping means of extensions 14 and 15 over a considerable length, and therefore leverage by inward and outward forces on the bracket is resisted to keep it firmly anchored to the stud.

However, the bracket may be easily removed from the stud by engaging extension 14 or 15 by a hammer claw and levering it out from the stud in the direction of the length of the nail 17. The nails can then be driven back to the position shown in FIG. 1 and the bracket used again.

Figure 3:
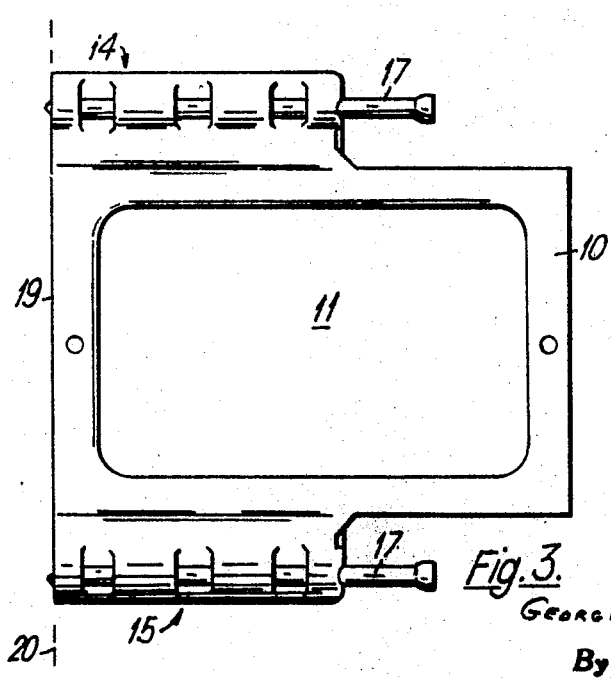
FIG. 3 shows a view similar to FIG. 1 of a modification.

FIG. 3 shows a bracket similar in all respects to that of FIGS. 1 and 2, except that the longer dimension of aperture 11 is horizontal instead of vertical.

Extensions 14, 15 are then made longer than those in FIGS. 1 and 2 with even better holding to the stud.

The embodiments illustrated are the presently preferred constructions according to the invention.

Various changes can, however be made in these arrangements without departing from the invention.

For example, extensions 14, 15 may retain the nails 17 in a position other than parallel to the front plate 10. The nails may point rearwardly so as to increase their accessibility at the head end and put their entry point further behind the front edge of the stud.

Alternatively, the nails may converge towards the edge 19 in a plane parallel with front plate 10, also with increased accessibility.

The sheet metal front plate is rectangular with a rectangular cutout for the switch or outlet plate therein, and may be ribbed to increase rigidity. A first edge is designed to abut a wall stud.

Flush with this first edge are extensions at top and bottom of the front plate. The extensions are bent somewhat rearwardly of the front plate and their outer ends are rolled to form a tube around a nail in each case. The length of each tube is somewhat less than the length of the nail to be used, so that the nail may be driven well into the stud before its head comes against the far end of the tube.

The angles between each extension and the front plate may be made different and their lengths different, so that for transport and storage the brackets will nest one within the other to save space.

In use, said first edge of the front plate, and therefore one end of each tube, is butted against the side of the stud in the desired position. The nails, being outside the periphery of the front plate, are easily accessible for hammering, and, being to the rear, contact the stud inwardly of its front edge. The two nails are driven through the tubes into the stud until their heads are tight against the ends of the tubes.

The bracket is particularly firmly secured owing to the extended contact between each nail and its tube.

The bracket is clearly much easier and quicker to secure than that previously used and can be made of less front-to-back dimensions, so that brackets mounted opposite each other in a wall do not bulge the wall sheeting.

Although the tubes are normally made parallel to the front plate, they may be tilted up or down or rearwardly with respect thereto to give still easier driving of the nails.

Various changes and modifications may be made in the arrangement described without departing from the invention.

What I claim is:

1. A bracket for attaching a flush-type electrical plate to a wall stud of a building, including;
    a front plate apertured to accommodate said electrical plate and having one edge adapted to led adjacent said stud;
    a pair of extensions projecting one from each of the edges of said front plate flanking said one edge, each said extension extending rearwardly out of the plane of said front plate; and
    nail gripping means on each extension to hold a nail firmly, each nail gripping means locating its nail parallel to but behind the plane of said front plate, and the nail being movable longitudinally through said means for driving into said stud when the bracket is in position for attachment.

2. The bracket as claimed in claim 1 in which each extension includes a plurality of axially spaced slits bent alternately in and out to provide said nail gripping means.